Aug. 28, 1951 E. W. BAGGOTT 2,566,111
TOY WHEEL CONSTRUCTION
Filed Sept. 11, 1948
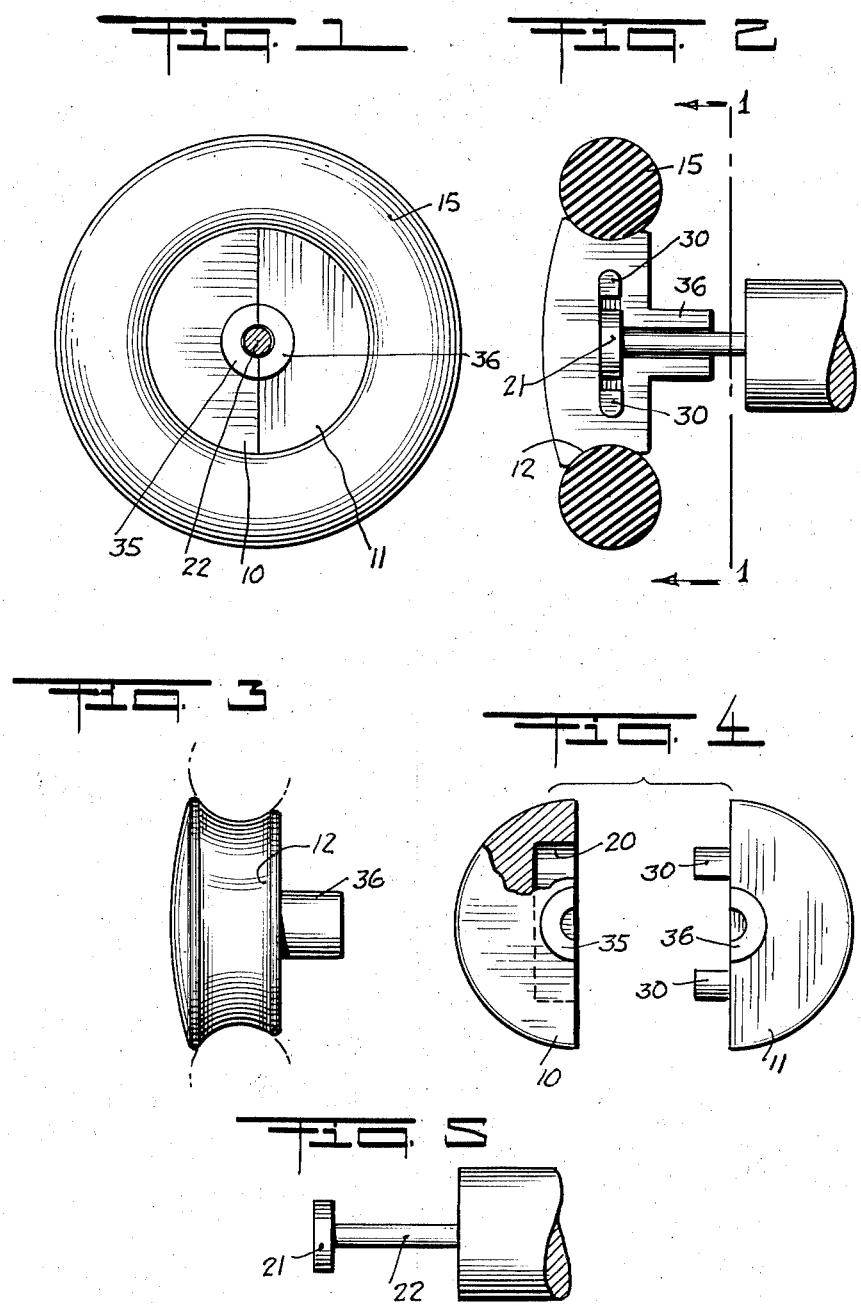
INVENTOR.
Edmund W. Baggott
BY
Mock&Blum
ATTORNEYS Patented Aug. 28, 1951

2,566,111

UNITED STATES PATENT OFFICE 2,566,111

TOY WHEEL CONSTRUCTION

Edmund W. Baggott, New York, N. Y., assignor to Ideal Toy Corporation, a corporation of New York Application September 11, 1948, Serial No. 48,781

2 Claims. (Cl. 301—1)

1

This invention relates to a wheel construction for toy vehicles and similar wheel toys.

The invention pertains especially, but not exclusively, to wheels made of plastics or wood.

It has been found difficult to properly attach plastic wheels to plastic or metal axles. The problem is not only in the method of application but also in the ultimate construction of the wheel and axle assemblies. It has not heretofore been found possible to conveniently attach a plastic wheel to a plastic or metal axle in such manner that the wheel will rotate freely on the axle without danger of falling off the axle under conditions of normal use.

In the present invention a wheel construction is provided in which the wheel may very easily be mounted upon the axle for free rotation thereon without the aforesaid danger of becoming dislodged from the axle in normal use. In essence this invention comprises the making of the wheel in a minimum of two complementary units which are held together by means of a suitable tire. A recess is provided in each of the wheel parts which combines with the recesses of the other parts to form an axial bearing for the axle. The axle, for its part, is provided with an enlarged end portion which is rotatively receivable in the wheel bearing. When the wheel parts are in assembled condition, axial movement of the axle is prevented and conversely axial movement of the wheel relative to the axle is, by the same token, also prevented.

It is accordingly the principal object of this invention to provide a wheel construction of the character described which is relatively easy to make and relatively easy to assemble and wherein the wheel is free to rotate easily on the axle although it is locked securely thereon against axial displacement relative thereto.

A preferred form of this invention is shown in the accompanying drawing in which Fig. 1 is an inside face view of a wheel made in accordance with the present invention, said view constituting a section on the line 1—1 of Fig. 2;

Fig. 2 is an inside view of one of the wheel parts, showing the axle mounted in its recess and showing the tire in diametrical cross section;

Fig. 3 is an outside or peripheral view of the wheel with its tire removed therefrom;

Fig. 4 is an inside face view of the two parts of the wheel, showing them in unassembled position, one of said parts being partly broken away and in section to expose the recess formed therein, which, in part, serves as a bearing for the axle end; and

2

Fig. 5 is a view of the axle which cooperates with said wheel.

It has above been stated that the wheel herein claimed is made of several cooperating parts which are held together by means of a tire. In the preferred form of this invention only two parts 10 and 11 respectively are used, but this construction should be taken solely as illustrative of the present invention rather than as limitative thereof. Each part comprises what may be described as a segment of a circle, and each part has a concave groove 12 formed therein, peripherally thereof. The two grooves 12 complement each other to form a peripheral seat for a tire 15. When the two parts 10 and 11 are placed together in the manner shown in Fig. 1 they form a wheel which is held together by means of the tire. The tire not only prevents radial movement of the two parts of the wheel relative to each other but, in conjunction with its concave seat in said wheel, it tends to prevent relative axial movement of the two parts of the wheel.

A recess 20 is formed in each of the wheel parts, and when the wheel parts are placed together in the manner shown in Fig. 1, their respective recesses register with each other to provide a seat or bearing for the end portion 21 of axle 22. End portion 21 is a disc or wheel-shaped member which is concentric with the axle. When this disc shaped end piece is inserted into the two recesses and the tire is mounted upon the two wheel parts to hold them together, the rotary movement of said end piece in said recesses is thereby provided or rendered possible, but endwise or axial movement of the axle and its end piece relative to the wheel is thereby prevented.

When the two recesses are in registration with each other, they need only describe a circular space to serve as a bearing seat for the end piece of the axle. If desired, however, these recesses may be elongated in the manner shown in Figs. 2 and 4. In one of the recesses pins 30 may be inserted for lining up the two wheel parts. These pins would project into the recess opposite the recess in which they are fixed, thereby aligning the two wheel parts and preventing axial displacement of the one relative to the other.

A pair of arcuate bosses 35 and 36 respectively may be formed on the inner face of the two wheel parts. When these two bosses register with each other, which they do when the two wheel parts are held together by the tire, they provide an additional bearing, this bearing serving the axle only and not its end piece 21. It will be noted in Fig. 2 that the bearing which arcuate bosses 35 and 36 provide, is carried through the wheel parts to the recesses formed therein. If desired, this elongated bearing may serve as the only bearing in the wheel, the wheel recesses functioning solely to accommodate the end piece 21 and to prevent axial movement of the wheel relative to the axle.

The wheel parts may be molded out of plastics material and pins 30 may constitute integral parts of the molding. End piece 21 and axle 22 may also comprise integral parts of a single entity. Tire 15 should preferably be made of rubber but other suitable material may also be used.

It will be appreciated that the foregoing is a description of a preferred form of this invention and that modifications and changes may be incorporated therein within the broad scope and spirit of the invention.

I claim:

1. A wheel and axle constructed for toy vehicles comprising a wheel, a resilient tire on said wheel, and an axle on which said wheel is rotatably mounted, said wheel comprising a pair of complementary solid semi-cylindrical sections, said sections being held in assembled position by said tire, each of said sections having a recess formed therein which register with each other to provide a centrally located recess in said wheel, one of said sections being provided with a pair of locking pins located at the extremities of the recess formed therein, said locking pins being insertable in the corresponding recess of the opposite section for aligning the said sections, an axial hole formed on the center face of the wheel in communication with the internal recess thereof, the axle for the said wheel having an end disc portion which is rotatably mountable within said central recess, the shaft of the axle being rotatably mountable in the axial hole.

2. A wheel and axle construction in accordance with claim 1, in which the two sections that form the wheel are peripherally grooved, the resilient tire being located in said groove, the said tire frictionally engaging the said groove and holding the said sections in their assembled positions.

EDMUND W. BAGGOTT.

REFERENCES CITED

The following references are of record in the file of this patent:

UNITED STATES PATENTS

| Number | Name | Date |
|---|---|---|
| 405,932 | Warner | June 25, 1889 |
| 864,333 | Pilz | Aug. 27, 1907 |
| 1,278,595 | Cole | Sept. 10, 1918 |
| 1,320,551 | Holley | Nov. 4, 1919 |
| 1,420,156 | Skeels | June 20, 1922 |
| 2,175,646 | Replogle | Oct. 10, 1939 |